United States Patent
Kubota et al.

(10) Patent No.: US 10,947,397 B2
(45) Date of Patent: Mar. 16, 2021

(54) OPTICAL APPARATUS, FILM TO BE PROVIDED ON SURFACE OF OPTICAL APPARATUS, PAINT TO BE USED FOR OPTICAL APPARATUS

(71) Applicant: CANON KABUSHIKI KAISHA, Tokyo (JP)

(72) Inventors: Reiko Kubota, Yokohama (JP); Yoji Teramoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 15/942,839

(22) Filed: Apr. 2, 2018

(65) Prior Publication Data
US 2018/0298210 A1    Oct. 18, 2018

(30) Foreign Application Priority Data
Apr. 12, 2017    (JP) .................................. 2017-078707

(51) Int. Cl.
*C09D 7/62*    (2018.01)
*C09D 133/14*    (2006.01)
(Continued)

(52) U.S. Cl.
CPC .................. *C09D 7/62* (2018.01); *C08K 3/36* (2013.01); *C08K 9/02* (2013.01); *C09D 5/004* (2013.01);
(Continued)

(58) Field of Classification Search
CPC ........ C09D 7/62; C09D 5/004; C09D 133/14; C09D 7/68; C09D 7/67; C09D 7/61;
(Continued)

(56) References Cited

U.S. PATENT DOCUMENTS

| 9,663,664 B2 | 5/2017 | Tasaki et al. |
| 10,351,713 B2 | 7/2019 | Tasaki et al. |

(Continued)

FOREIGN PATENT DOCUMENTS

| CN | 101378898 A | 3/2009 |
| CN | 102015915 A | 4/2011 |

(Continued)

OTHER PUBLICATIONS

Machine translation of JP 2010-038957 A. (Year: 2010).*
(Continued)

*Primary Examiner* — Kimberly N. Kakalec
(74) *Attorney, Agent, or Firm* — Venable LLP

(57) ABSTRACT

There is provided an optical apparatus which comprises a lens, and a lens barrel holding the lens, wherein a film is formed on a surface of the lens barrel, the film contains a resin, titanium oxide coated with silica, and an inorganic particle, an average particle size of the inorganic particle is 10 nm or more and 110 nm or less, and an average particle size of the titanium oxide coated with the silica is 0.2 μm or more. Thus, it is possible to achieve the optical apparatus which, in an anoxic atmosphere, has less discoloration due to sunlight and less reflectance deterioration even when color is thin, and has the high solar reflectance.

22 Claims, 9 Drawing Sheets

(51) Int. Cl.
*C09D 7/40* (2018.01)
*C09D 7/61* (2018.01)
*C08K 3/36* (2006.01)
*C08K 9/02* (2006.01)
*G02B 7/02* (2006.01)
*G02B 1/14* (2015.01)
*C09D 5/33* (2006.01)
*C08K 3/22* (2006.01)

(52) U.S. Cl.
CPC ............... *C09D 7/61* (2018.01); *C09D 7/67* (2018.01); *C09D 7/68* (2018.01); *C09D 133/14* (2013.01); *G02B 1/14* (2015.01); *G02B 7/028* (2013.01); *C08K 2003/2237* (2013.01); *C08K 2003/2241* (2013.01); *C08K 2201/001* (2013.01); *C08K 2201/005* (2013.01)

(58) Field of Classification Search
CPC . G02B 1/14; G02B 7/028; G02B 1/10; G02B 5/0808; C08K 3/36; C08K 9/02; C08K 2003/2241; C08K 2201/001; C08K 2003/2237; C08K 2201/005; C08K 9/10; G03B 11/00
See application file for complete search history.

(56) References Cited

U.S. PATENT DOCUMENTS

| | | | |
|---|---|---|---|
| 2009/0029176 A1* | 1/2009 | Nishida | B32B 15/08 428/421 |
| 2011/0041726 A1* | 2/2011 | Robb | C09D 7/68 106/31.13 |
| 2013/0148205 A1 | 6/2013 | Kobayashi et al. | |
| 2015/0361270 A1 | 12/2015 | Tasaki et al. | |
| 2017/0299840 A1 | 10/2017 | Kubota et al. | |

FOREIGN PATENT DOCUMENTS

| | | |
|---|---|---|
| CN | 104955905 A | 9/2015 |
| EP | 0 730 168 A2 | 9/1996 |
| JP | 2010-38957 A | 2/2010 |
| JP | 2013-24229 A | 2/2013 |
| WO | 2009/136141 A1 | 11/2009 |

OTHER PUBLICATIONS

Extended European Search Report in European Application No. 18166850.0 (dated Aug. 10, 2018).
First Office Action in Chinese Application No. 201810323174.X (dated Mar. 12, 2020).

* cited by examiner

OPTICAL APPARATUS, FILM TO BE PROVIDED ON SURFACE OF OPTICAL APPARATUS, PAINT TO BE USED FOR OPTICAL APPARATUS

BACKGROUND OF THE INVENTION

Field of the Invention

The present invention relates to a film and paint to be provided on a lens barrel of an optical apparatus such as a camera, a video camera, a broadcasting device or the like, and on the surface of an optical apparatus such as a camera main body, a video camera main body, a surveillance camera, a weather camera or the like to be possibly used outdoors, and to an optical apparatus.

Description of the Related Art

A film to be provided on the surface of an optical apparatus is a film which has a function of suppressing a temperature rise of a member due to sunlight when it is used outdoors. Conventionally, as a method of suppressing the temperature rise of the member due to sunlight, as illustrated in FIG. 1, there has been known a method of reflecting incident light 1 by the sun as reflected light 2 by an infrared reflection film 4 on a base material 5'. In this method, heat generation due to transmitted light 3 can be suppressed by increasing a ratio of the reflected light 2 to the incident light 1. As a material to be used for increasing a reflectance, titanium oxide having a high reflectance from a visible light region to an infrared region is often used. In addition, a solar energy distribution is 47% in the visible light region and 50% in the infrared region, so that a high reflectance in a wide range from the visible light region to the infrared region is required.

Besides, since the optical apparatus is often used outdoors, in addition to heat-shielding performance, also lightfastness (light resistance) under a severe sunlight condition such as a midsummer condition, an equatorial condition or the like is required. Moreover, there is a case where a tape such as a cellophane adhesive tape, a masking tape, a gummed tape, a Tepra™ tape or the like may be stuck to a part of the surface of the film provided on the surface of the optical apparatus. On this account, in some cases, the lightfastness is required also when oxygen is no longer supplied from the outside because the tape has been stuck and thus it becomes an anoxic state.

Japanese Patent Application Laid-Open No. 2010-38957 discloses a coating film which is used for a lens barrel. In this film, lightness L is 70 or more so that color is thin, reflectance of light having a wavelength of 900 nm or more and less than 1700 nm is as high as 70% or more, and Ti may be contained. In Japanese Patent Application Laid-Open No. 2010-38957, the reflectance is high even in the visible light region because the lightness is high, and also the reflectance of light in the infrared region, that is, the wavelength of 900 nm or more and less than 1700 nm, is high, so that a relatively high heat-shielding effect can be given. Incidentally, although Si, Al, Ti, Fe, Zn, Co, Mg, Ca, Sr, Ba and Cu are described as pigments in Japanese Patent Application Laid-Open No. 2010-38957, titanium oxide which is an oxide of Ti is indispensable in order to set the reflectance of light having the wavelength of 900 nm or more and less than 1700 nm to 70%.

Japanese Patent Application Laid-Open No. 2013-24229 discloses titanium oxide of which the surface is coated with silica to improve lightfastness. Here, the titanium oxide has a property of being excited by sunlight and thus deteriorating a resin. In Japanese Patent Application Laid-Open No. 2010-38957, even if the titanium oxide of which the surface is coated with the silica is excited by the sunlight, the lightfastness under an ordinary sunlight condition is good because the surface of the titanium oxide has been coated with the silica.

However, in a case where the film as disclosed in Japanese Patent Application Laid-Open No. 2010-38957 having the high lightness and necessarily containing the titanium oxide is exposed to sunlight on an anoxic condition, discoloration of the film occurs due to the excitation of the titanium oxide, an external appearance deteriorates, and a reflectance of visible light also deteriorates. On the other hand, Japanese Patent Application Laid-open No. 2010-38957 also discloses a coating film which is used for the lens barrel and has lightness of less than 70. When the lightness becomes less than 70, the color of the film becomes black and the pigment or the like absorbs the sunlight. Therefore, even when the discoloration occurs in the film due to the exposure by the sunlight on the anoxic condition, it is difficult to discern a difference due to the discoloration. However, since the color is black and the reflectance in the visible light region is low, a high heat-shielding effect cannot be given.

Besides, the titanium oxide described in Japanese Patent Application Laid-Open No. 2013-24229 has little discoloration under normal sunlight. However, when a tape is provided on the film surface and the film is exposed to the sunlight in an anoxic state, it is difficult to prevent the discoloration.

The present invention has been made in view of the related background arts as described above. And, an object of the present invention is to provide a film and paint which are provided on the surface of the optical apparatus, which have less discoloration by sunlight and less reflectance deterioration in an anoxic atmosphere even when color is thin, and which have a high solar reflectance, and is to also provide the optical apparatus which has the above film and/or paint.

SUMMARY OF THE INVENTION

The present invention relates to an optical apparatus which comprises a lens, and a lens barrel holding the lens, and is characterized in that a film is formed on a surface of the lens barrel, the film contains a resin, titanium oxide coated with silica, and an inorganic particle, an average particle size of the inorganic particle is 10 nm or more and 110 nm or less, and an average particle size of the titanium oxide coated with the silica is 0.2 μm or more.

Further, the present invention relates to a film which contains a resin, titanium oxide coated with silica, and an inorganic particle, and is characterized in that an average particle size of the inorganic particle is 10 nm or more and 110 nm or less, and an average particle size of the titanium oxide coated with the silica is 0.2 μm or more.

Furthermore, the present invention relates to paint which contains a resin, titanium oxide coated with silica, and an inorganic particle, and is characterized in that a content of the titanium oxide coated with the silica is 20% by mass or more and 60% by mass or less with respect to a nonvolatile component in the paint, a content of the inorganic particles is 0.6% by mass or more and 14% by mass or less with respect to the nonvolatile component in the paint, an average particle size of the titanium oxide coated with the silica is 0.2

µm or more, and an average particle size of the inorganic particle is 10 nm or more and 110 nm or less.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First, a method of suppressing discoloration and reflectance deterioration in an anoxic atmosphere will be described. Then, paint (coating material) to be formed on the upper surface of an optical apparatus for suppressing the discoloration and the reflectance deterioration in the anoxic atmosphere, a film to be formed on the upper surface of the optical apparatus for the same purpose, and the optical apparatus will be described.

[Method of Suppressing Discoloration and Reflectance Deterioration in Anoxic Atmosphere]

(Discoloration of Titanium Oxide Due to UV and Suppressing Method)

Figure 1:
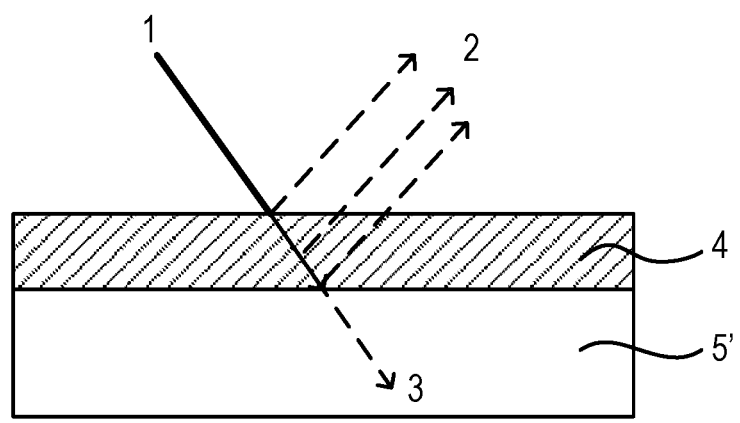
FIG. 1 is a cross-section schematic diagram for illustrating a state of reflection and absorption of sunlight when a film to be provided on the surface of an optical apparatus is formed on an upper surface of a base material.
Figure 2:
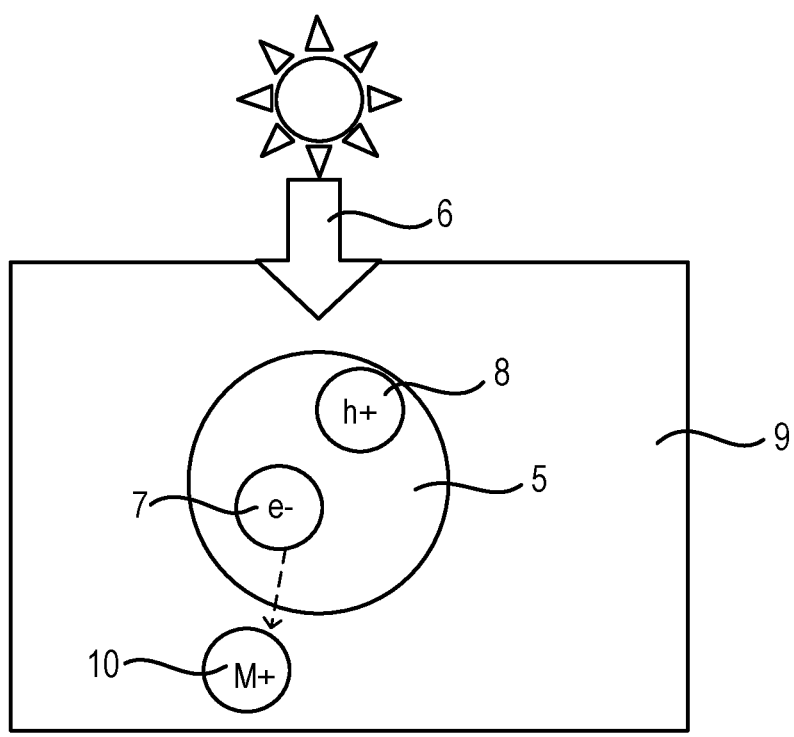
FIG. 2 is a cross-section schematic diagram for illustrating a state that sunlight is irradiated to a film made of titanium oxide and a resin.
Figure 3:
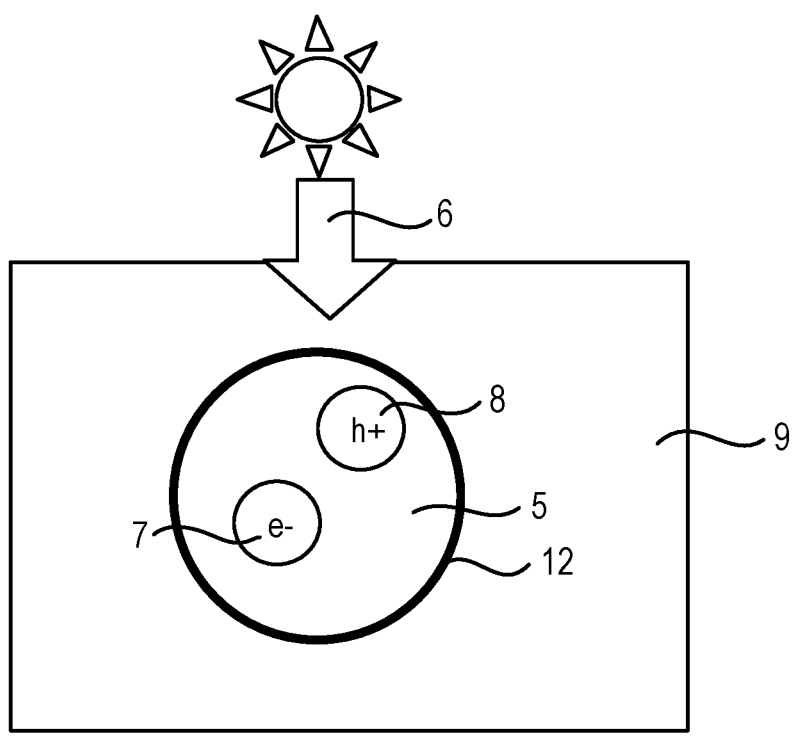
FIG. 3 is a cross-section schematic diagram for illustrating a state that sunlight is irradiated to a film made of titanium oxide coated with second silica, and a resin.

As illustrated in FIG. 2, titanium oxide 5 has the property of being excited by irradiation with sunlight 6 and being divided into an electron (e−) 7 and a hole (h+) 8. In a case where there is no film coated on the surface of the titanium oxide 5, a cation M+ 10 such as water contained in the resin 9 is attracted to the excited electron 7 and bonded to Ti, so that $TiO_2$ is reduced (deoxidized) to TiO, and thus discoloration occurs. As illustrated in FIG. 3, in a case where a film of second silica 12 or the like is coated on the surface of the titanium oxide 5, even if the electron 7 is generated by excitation by the sunlight 6, the coating film of the second silica 12 becomes a barrier so that the electron 7 and the hole 8 are re-bonded to each other, and thus discoloration can be suppressed.

(Discoloration of Titanium Oxide in Anoxic Atmosphere)

Figure 4:
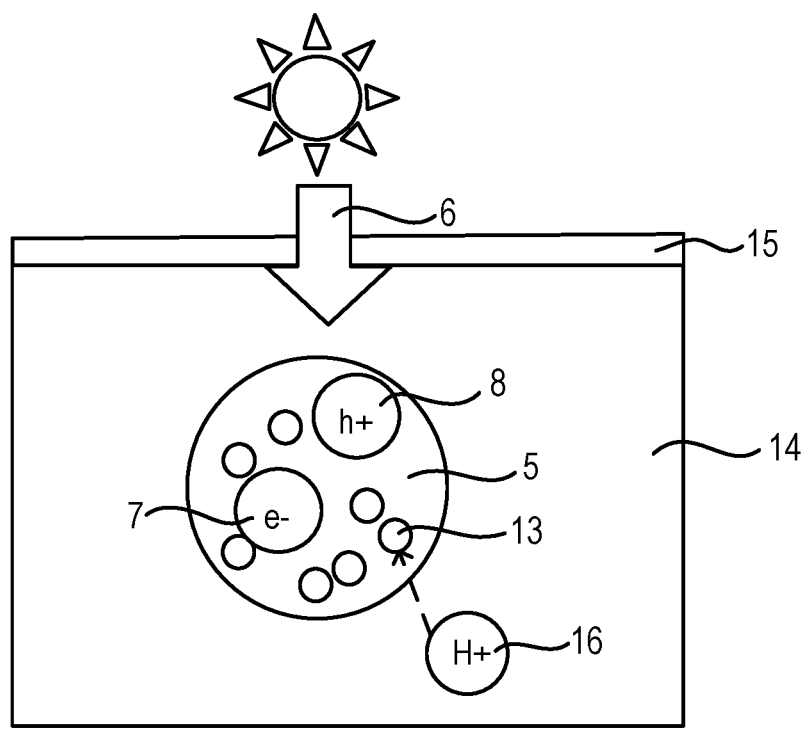
FIG. 4 is a cross-section schematic diagram for illustrating a state that a film containing titanium oxide is coated with a tape and irradiated with sunlight.

As illustrated in FIG. 4, in the titanium oxide 5, usually Ti and O are regularly arranged, but the structure of the titanium oxide has some oxygen defects 13. When the sunlight 6 is irradiated in an anoxic state made by, for example, sticking a tape 15 to the upper surface of a film 14, the titanium oxide 5 is excited and divided into the electron (e−) 7 and the hole (h+) 8, so that the titanium oxide has the property that the electron 7 is attracted to the oxygen defect 13. When the electron 7 entering the oxygen defect 13 is attracted to a cation 16 such as a hydrogen ion (H+) 8, $Ti^{4+}$ is reduced to $TiO^{3+}$, so that the white titanium oxide turns into bluish titanium oxide and thus a solar reflectance deteriorates.

(Method of Suppressing Discoloration Even in Anoxic Atmosphere in Present Invention)

In order to suppress the discoloration of the titanium oxide in the anoxic state, it has been found that it is effective to prevent infiltration of the cation from the resin side by forming an inorganic film such as silica or the like on the surface of the titanium oxide. However, it has been found that the discoloration in the anoxic atmosphere cannot be completely suppressed even when the surface of the titanium oxide is coated with the inorganic film such as the silica or the like.

The inventors of the present invention conducted intensive studies on a method of further suppressing the discoloration in the anoxic atmosphere. Thus, it has been found the discoloration in the anoxic atmosphere can be further suppressed by adding, in the film, inorganic particles each having a particle size (diameter) smaller than that of the titanium oxide coated with silica (the second silica).

Figure 5:
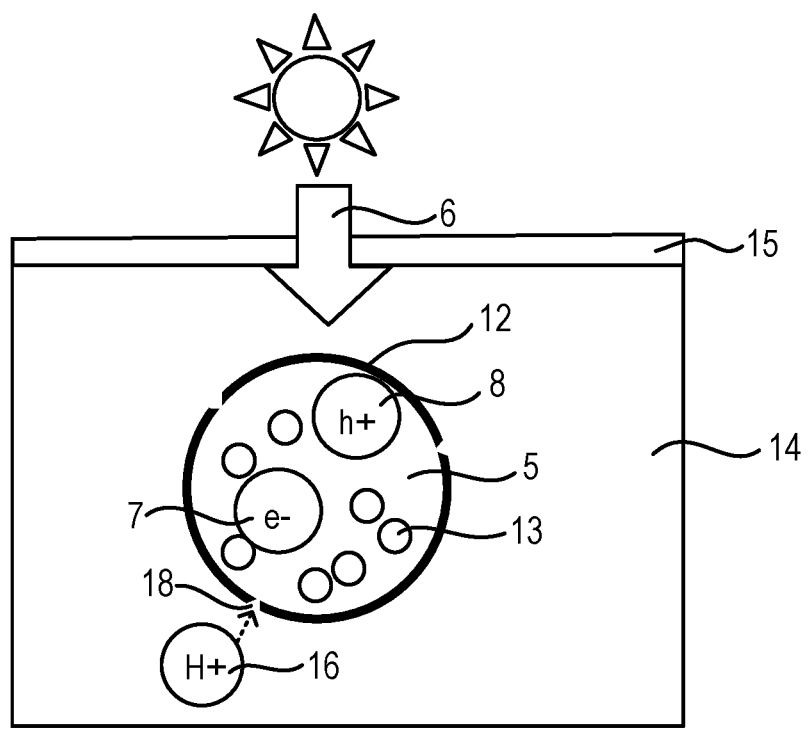
FIG. 5 is a cross-section schematic diagram for illustrating a state that a film containing titanium oxide coated with the second silica is coated with a tape and irradiated with sunlight.
Figure 6:
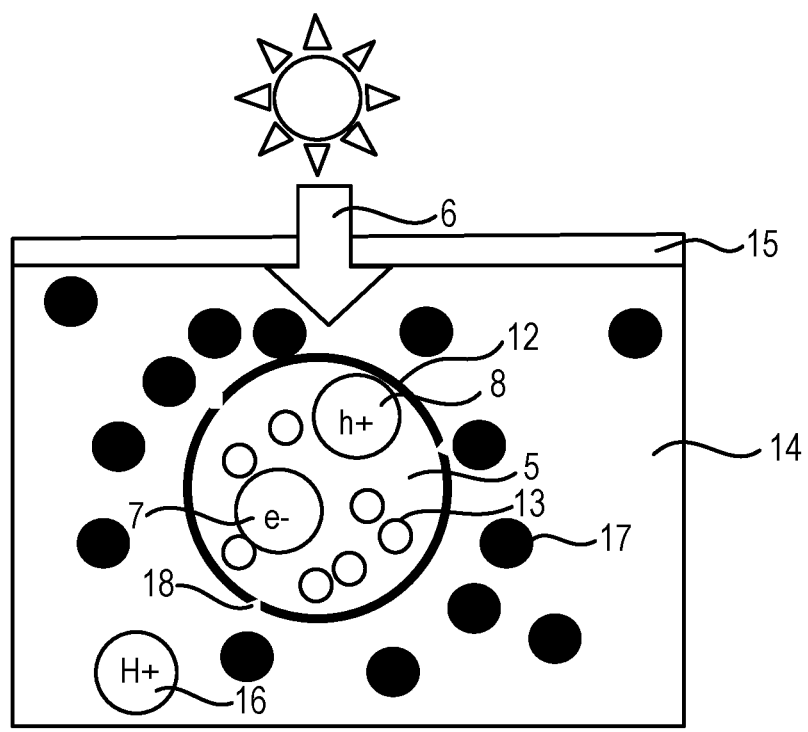
FIG. 6 is a cross-section schematic diagram for illustrating a state that a film containing titanium oxide coated with the second silica and first silica is coated with a tape and irradiated with sunlight.

As illustrated in FIG. 5, it is supposed that silica minute defects 18 exist in the titanium oxide 5 coated with the second silica 12, the cation 16 infiltrates into the titanium oxide 5 through the silica minute defect 18, the reduction of the titanium oxide 5 is caused, and thus the discoloration is occurring. Here, particles have the property that a small particle is attracted to a large particle due to a difference in electric charge. Therefore, as illustrated in FIG. 6, inorganic particles 17 each having a smaller particle size than the titanium oxide 5 coated with the second silica 12 is allowed to exist in the film 15, and the inorganic particles 17 are attracted around the titanium oxide 5 coated with the second silica 12, so that the silica minute defects 18 are filled. In the film of the present invention, since the inorganic particle 17 is allowed to exist in the film 15, the infiltration of the cation 16 can be suppressed by filling the silica minute defect 18 of the titanium oxide 5 coated with the second silica 12, so that the discoloration can be suppressed even in the anoxic atmosphere.

Since the coating film formed on the surface of the titanium oxide 5 is the silica (second silica 12), the same kind of silica is preferable for the inorganic particles 17. However, since it is only necessary to prevent the infiltration of the cation 16 from the silica minute defect 18 into the titanium oxide 5, it is possible to use alumina and zirconia in addition to the silica.

Incidentally, in the following description, the silica particle is typically used as the inorganic particle 17 and is called a "first silica 17".

[Optical Apparatus]

Figure 7:
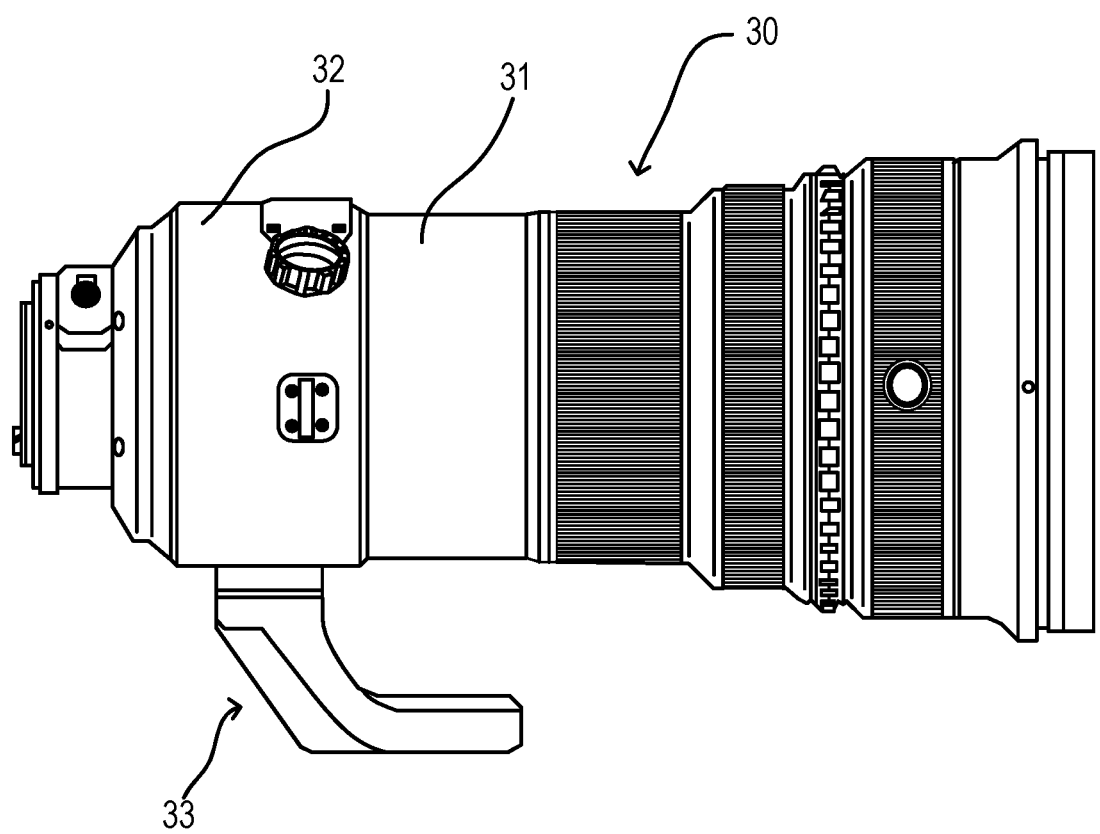
FIG. 7 is an appearance diagram for illustrating an example of a camera interchangeable lens which has a lens barrel being one embodiment of the optical apparatus of the present invention.

The optical apparatus of the present invention is constituted such that a film is formed on at least a lens and the surface of a lens barrel. FIG. 7 is an appearance diagram of a camera interchangeable lens for a camera having a lens barrel which is one embodiment of the optical apparatus of the present invention. The interchangeable lens has a lens barrel 30 and a tripod mount 33, and the lens barrel 30 is constituted by a lens, a fixed barrel 31, an annular member 32 and the like. Among them, the feature of the optical apparatus of the present invention lies in the film which is formed on the surfaces of the fixed barrel 31, the annular member 32 and the like of the lens barrel 30.

[Paint to be Formed on Upper Surface of Optical Apparatus]

Hereinafter, a material constitution of the paint for the optical apparatus of the present invention and a method of manufacturing the paint for the optical apparatus of the present invention will be described.

<<Material Constitution>>

(Titanium Oxide Coated with Second Silica)

The titanium oxide which is coated with the second silica contained in the paint of the present invention will be described.

As the titanium oxide of the present invention, rutile type titanium oxide and anatase type titanium oxide can be used. Besides, the titanium oxide is coated with at least the second silica. In a case where the titanium oxide is not coated with the second silica, the discoloration of the titanium oxide in the anoxic atmosphere increases, and the reflectance deteriorates. Besides, the titanium oxide may be coated with a plurality of materials such as zirconium oxide, aluminum oxide, an organic matter and the like in addition to the silica.

The titanium oxide coated with the second silica of the present invention has an average particle size of 0.2 μm or more. When the average particle size of the titanium oxide coated with the second silica is less than 0.2 μm, the electric charge of the particle becomes low, so that it becomes difficult to attract the first silica and thus there is fear that the discoloration in the anoxic atmosphere increases. On the other hand, when the average particle size of the titanium oxide coated with the second silica exceeds 5 μm, unevenness of the coating film becomes large and film thickness accuracy deteriorates, so that there is fear that accuracy of focusing or the like deteriorates. Therefore, it is preferable that the average particle size of the titanium oxide coated with the second silica is 5 μm or less.

The content (contained amount) of the titanium oxide coated with the second silica of the present invention is 20% by mass or more and 60% by mass or less with respect to a nonvolatile component in the paint. When the content of the titanium oxide coated with the second silica is less than 20% by mass, sunlight is transmitted through the coating film, so that there is fear that the reflectance deteriorates. Besides, when the content of the titanium oxide coated with the second silica exceeds 60% by mass, there is fear that brittleness of the film deteriorates.

(Resin)

Next, the resin contained in the paint of the present invention will be described.

An arbitrary resin may be used as the resin of the present invention as long as adhesion to the base material can be secured. As an example of the resin, an epoxy resin, a urethane resin, an acrylic resin, a urethane acrylic resin, a fluorine resin, a silicone resin, a phenolic resin, an alkyd resin or the like is given. The above resin may be used alone or in combination of two or more.

The content of the resin of the present invention is preferably 20% by mass or more and 60% by mass or less, more preferably 30% by mass or more and 55% by mass or less. When the content of the resin of the present invention is less than 20% by mass, there is fear that the adhesion to the base material deteriorates. On the other hand, when the content of the resin of the present invention exceeds 60% by mass, there is fear that the solar reflectance of sunlight deteriorates.

(First Silica)

Next, the first silica contained in the paint of the present invention will be described.

The silica of the present invention has an average particle size of 10 nm or more and 110 nm or less. When the average particle size of the silica of the present invention is less than 10 nm, force of filling the minute defect of the second silica decreases, so that there is fear that an effect of suppressing the discoloration in the anoxic atmosphere deteriorates. On the other hand, when the average particle size of the silica of the present invention exceeds 110 nm, adsorptivity to the titanium oxide decreases, so that there is fear that a discoloration reducing effect in the anoxic atmosphere deteriorates.

The shape of the first silica of the present invention can be arbitrary. As an example of the shape of the silica of the present invention, a spherical shape, an amorphous shape, a starlike shape, a chainlike shape, a hollow shape or a porous shape is given. The silica like this may be used alone or in combination of two or more.

The content of the first silica of the present invention is 0.6% by mass or more and 14% by mass or less, preferably 1% by mass or more and 10% by mass or less with respect to a nonvolatile component in the paint. When the content of the first silica of the present invention is less than 0.6% by mass, the second silica minute defects cannot be filled completely, so that there is fear that the discoloration in the anoxic atmosphere deteriorates. On the other hand, when the content of the first silica of the present invention exceeds 14% by mass, there is fear that the reflectance deteriorates due to haze of the coating film.

(Pigment)

Next, a pigment contained in the paint of the present invention will be described.

It is preferable that the pigment of the present invention can be adjusted so that the coating film has lightness of 71 or more, more preferably the lightness of 71 or more and 85 or less. When the pigment of the present invention has the lightness of less than 71, the solar reflectance deteriorates, so that a temperature reduction effect deteriorates. When the lightness of the film of the present invention exceeds 85, the absorption of sunlight by the pigment is reduced, so that the discoloration in the anoxic atmosphere occurs to some extent. Besides, it is preferable that the pigment of the present invention reflects or transmits infrared rays.

The pigment of the present invention is a coloring agent, and the coloring agent may be an organic pigment, an inorganic pigment or a combination thereof.

As an example of the organic pigment, an azomethine black pigment, a perylene pigment or the like is given. As an example of the inorganic pigment, a Co—Zn—Si system pigment, a Co—Al system pigment, a Co—Al—Cr system pigment, a Co—Al—Cr—Zn system pigment, a Co—Al—Zn—Ti system pigment, a Co—Ni—Zn—Ti system pigment, a Ti—Cr—Sb system pigment, a Ti—Fe—Zn system pigment, an Fe—Zn system pigment, an Fe—Cr system pigment, an Mn—Bi system pigment, a Co—Cr—Zn—Sb system pigment, a Cu—Cr system pigment, a Cu—Cr—Mn system pigment, a Cu—Fe—Mn system pigment, an Mn—Y system pigment, an Mn—Sr system pigment, a Co—Cr—Zn—Al—Ti system pigment, a Co—Cr—Zn—Ti system pigment, a Ti—Cr—Sb system pigment, a P—Ba—Sr system pigment or the like is given.

As the pigment of the present invention, a pigment of arbitrary color can be used. As an example of the color, black, brown, yellow, red, blue, purple, pink, green and orange is given. The pigment may be used alone or in combination of two or more.

It is preferable that the average particle size of the pigment of the present invention is 10 nm or more and 5000 nm or less, more preferably 100 nm or more and 3000 nm or less. When the average particle size of the pigment of the present invention is less than 10 nm, the absorption of sunlight is reduced, so that there is fear that the discoloration suppressing effect in the anoxic atmosphere deteriorates. When the average particle size of the pigment of the present invention exceeds 5000 nm, the unevenness of the coating film becomes large and the film thickness accuracy deteriorates, so that there is fear that accuracy of focusing or the like deteriorates.

It is preferable that the content of the pigment of the present invention is 15% by mass or less. When the content of the pigment of the present invention exceeds 15% by mass, a color tint of the coating film becomes darker, so that there is fear that the lightness decreases. The content of the pigment of the present invention may be 0% by mass.

(Solvent)

Next, a solvent contained in the paint will be described.

As a solvent, an arbitrary material may be used. As an example of the solvent, water, thinner, ethanol, isopropyl alcohol, n-butyl alcohol, ethyl acetate, propyl acetate, isobutyl acetate, butyl acetate, methyl ethyl ketone, methyl isobutyl ketone, propylene glycol monomethyl ether, toluene, xylene, acetone, cellosolves, glycol ethers or ethers is given. The above solvent may be used alone or in combination of two or more.

A preferable viscosity of the paint of the present invention is 10 mPa·s or more and 10000 mPa·s or less, more preferably 50 mPa·s or more and 500 nmPa·s or less. When the viscosity of the paint is less than 10 mPa·s, there may be a case where a portion in which the film thickness of a heat-shielding film after coating is thinned occurs. On the other hand, when the viscosity of the paint exceeds 10000 mPa·s, there is fear that coatability of the paint deteriorates.

(Additive)

The heat-shielding paint of the present invention may contain another arbitrary additive as a part of the resin. As an example of the additive, a dispersant, a curing agent, a curing catalyst, a plasticizer, a thixotropy imparting agent, a leveling agent, a delustering agent, a preservative, an ultraviolet absorber, an antioxidant, a coupling agent, inorganic fine particles, organic fine particles or the like is given.

<<Method of Manufacturing Paint to be Formed on Upper Surface of Optical Apparatus>>

Hereinafter, a method of manufacturing the paint of the present invention will be described.

An arbitrary method can be used as the method of manufacturing the paint to be formed on the upper surface of the optical apparatus of the present invention as long as the titanium oxide coated with the second silica of the present invention and the second silica of the present invention can be dispersed in the painting. As an example of a device to be used in the above method, a bead mill, a ball mill, a jet mill, a three-roll mill, a planetary rotating device, a mixer, an ultrasonic disperser, a homogenizer or the like is given.

[Film to be Formed on Upper Surface of Optical Apparatus]

Hereinafter, the material constitution of the film to be formed on the upper surface of the optical apparatus of the present invention will be described. The film to be formed on the upper surface of the optical apparatus of the present invention contains at least the resin, the titanium oxide and the first silica.

<<Material Constitution>>

(Titanium Oxide Coated with Second Silica)

The content of the titanium oxide coated with the second silica of the present invention is preferably 10% by volume or more and 60% by volume or less with respect to the film, more preferably 15% by volume or more and 50% by volume or less. When the content of the titanium oxide coated with the second silica of the present invention is less than 10% by volume, light reaching the based material increases, so that there is fear that the solar reflectance of sunlight deteriorates. When the content of the titanium oxide coated with the second silica of the present invention exceeds 60% by volume, there is fear that the brittleness of the coating film deteriorates.

(Resin)

It is preferable that the content of the resin of the present invention is 10% by volume or more and 80% by volume or less, more preferably 15% by volume or more and 70% by volume or less. When the content of the resin of the present invention is less than 10% by volume, there is fear that the adhesion to the base material deteriorates. When the content of the resin of the present invention exceeds 80% by volume, there is fear that the solar reflectance of sunlight deteriorates.

(First Silica)

It is preferable that the content of the first silica of the present invention is 1% by volume or more and 10% by volume or less. When the content of the first silica of the present invention is less than 1% by volume, the second silica minute defects cannot be filled completely, so that there is fear that the discoloration in the anoxic atmosphere deteriorates. When the content of the first silica of the present invention exceeds 10% by volume, there is fear that the reflectance deteriorates due to the haze of the coating film.

(Pigment)

It is preferable that the content of the pigment of the present invention is 10% by volume or less, more preferably 5% by volume or less. When the content of the pigment of the present invention exceeds 10% by volume, the color tint of the coating film becomes darker, so that there is fear that the lightness decreases.

(Additive)

The heat-shielding paint of the present invention may contain another arbitrary additive as a part of the resin. As an example of the additive, a dispersant, a curing agent, a curing catalyst, a plasticizer, a thixotropy imparting agent, a leveling agent, a delustering agent, a preservative, an ultraviolet absorber, an antioxidant, a coupling agent, inorganic fine particles, organic fine particles or the like is given.

<<Film Constitution>>

The film to be formed on the upper surface of the optical apparatus of the present invention is formed at least outside the base material. The form may be in close contact with the base material, or a primer layer for improving the adhesion may be provided between the based material and the film formed on the upper surface of the optical apparatus.

(Base Material)

As the base material, an arbitrary material can be used, but metal or plastic is preferable. As an example of the metal material, an aluminum alloy, a titanium alloy, a stainless alloy, a magnesium alloy or the like is given. Besides, as an example of the plastic, a polycarbonate resin, an acrylic resin, an ABS resin, a fluorine resin or the like is given.

The film thickness of the base material can be an arbitrary thickness, but it is preferably 0.5 mm or more and 5 mm or less, and more preferably 0.5 mm or more and 2 mm or less. When the film thickness is less than 0.5 mm, it is difficult to maintain the shape of the lens barrel. When the film thickness exceeds 5 mm, the cost of the member increases.

(Primer)

The primer may be used for the purpose of improving the adhesion between the base material and the film.

As the primer, an arbitrary material can be used. More specifically, as an example of the primer, an epoxy resin, a urethane resin, an acrylic resin, a silicone resin, a fluorine resin or the like is given. Besides, the primer may contain the particles of the present invention, particles other than the present invention, and the residues of the coloring agent, the dispersant, the curing agent, the curing catalyst, the plasticizer, the thixotropy imparting agent, the leveling agent, an organic coloring agent, an inorganic coloring agent, the preservative, the ultraviolet absorber, the antioxidant, the coupling agent and a solvent.

It is preferable that the film thickness of the primer is 2 μm or more and 30 μm or less, and more preferably 5 μm or more and 20 μm or less. When the film thickness is less than 2 μm, the adhesion of the film may deteriorate. Further, when the film thickness exceeds 30 μm, positional accuracy may be adversely affected.

(Film Thickness of Film of Present Invention)

It is preferable that the film of the present invention preferably has a thickness of 10 μm or more and 70 μm or less. When the film thickness is less than 10 μm, there is fear that the solar reflectance deteriorates. When the film thickness exceeds 70 μm, positional accuracy of the optical apparatus may be adversely affected.

<<Method of Forming Film of Present Invention>>

It is possible to use an arbitrary coating method and an arbitrary curing method for the film of the present invention, as long as it is possible to uniformly coat the heat-shielding paint of the present invention at 10 μm or more and 70 μm or less.

As an example of the method of coating the heat-shielding film for the optical apparatus of the present invention, a brush coating method, a spray coating method, a dip coating method, a transferring method or the like is given. Besides, the heat-shielding film may be made by a single layer coating or by a multilayer coating, and an emboss process may be performed to the film to elaborate a design.

As the method of curing the heat-shielding film for the optical apparatus of the present invention, it may be allowed to stand the film at room temperature, to promote curing by arbitrary heat, or to apply ultraviolet rays to the film. As an example of the method of applying heat to cure, a method using a heating furnace, a method using a heater, a method using infrared heating, or the like is given. The curing temperature is preferably from the room temperature to 400° C., more preferably from the room temperature to 200° C.

<<Characteristics of Film of Present Invention>>

(Solar Reflectance)

The solar reflectance of the film to be formed on the upper surface of the optical apparatus of the present invention is 65% or more and 98% or less. When the solar reflectance is less than 65%, the temperature reduction effect deteriorates. Incidentally, in order to make the solar reflectance exceed 98%, it is necessary to cause a large amount of the titanium oxide to be contained, so that the brittleness of the film deteriorates.

(Lightness)

The lightness of the film to be formed on the upper surface of the optical apparatus of the present invention is or more. When the lightness is less than 71, the reflectance deteriorates so that the temperature reduction effect deteriorates.

Example

Hereinafter, preferred examples of the present invention will be described.

In Examples 1 to 11, preparation of the paint, making of the film, discoloration evaluation in the anoxic atmosphere, solar reflectance evaluation after a lightfast (light resistance) test in the anoxic atmosphere, and temperature reduction effect evaluation after the lightfast test were performed by the following methods.

<Discoloration Evaluation in Anoxic Atmosphere>

First, L*, a* and b* were measured using a color-difference meter (SE-7700; NIPPON DENSHOKU INDUSTRIES Co., Ltd.) for the discoloration evaluation in the anoxic atmosphere. For the sample for the measurement, the film of the present invention was formed on the metal plate having the size of 30 mm square and the thickness of 1 mm and used. As the metal plate, any one of the stainless alloy, the aluminum alloy, the titanium alloy and the magnesium alloy was used. The film of the present invention was applied to the metal plate of the magnesium alloy so as to have the film thickness of 50 μm with a spin coater and then burned. After the burning, the values of L*, a* and b* of the film of the present invention were measured using the color-difference meter. A cellophane adhesive tape (CT-12M; Nichiban Co., Ltd.) was stuck to the upper surface of the film of the present invention, and the obtained film was placed in a lightfast tester (SUNTEST XXL+; ATLAS) for 200 hours under the conditions of the direct irradiation 300 nm to 400 nm, the radiation intensity 50 W/m²±2 W/m² and the black panel temperature 63° C.±3° C. After the lightfast test, the cellophane adhesive tape was peeled from the film and washed with acetone, and the values of L*, a* and b* of the film of the present invention were measured using the color-difference meter within 24 hours. The discoloration (ΔE*) in the anoxic atmosphere was calculated by using the following expression (1).

$$\Delta E^* = \sqrt{\{(L^*\text{before lightfastness} - L^*\text{after lightfastness})^2 + (a^*\text{before lightfastness} - a^*\text{after lightfastness})^2 + (b^*\text{before lightfastness} - b^*\text{after lightfastness})^2\}} \quad (1)$$

When ΔE* is less than 0.6, it can be said that the film is a good film with a very little color tint change. When ΔE* is 0.6 or more and less than 1.0, it can be said that the film is a good film. When ΔE* is 1.0 or more and less than 1.5, it can be said that the film is a film within an allowable range although the color tint change slightly increases. When ΔE* is 1.5 or more, it cannot be said that the film is a good film because the color tint change is large.

(Four-Grade Evaluation of A to D)

A: ΔE± is less than 0.6
B: ΔE± is 0.6 or more and less than 1.0
C: ΔE± is 1.0 or more and less than 1.5
D: ΔE± is 1.5 or more <Solar Reflectance Evaluation after Lightfast Test in Anoxic Atmosphere>

Figure 8:
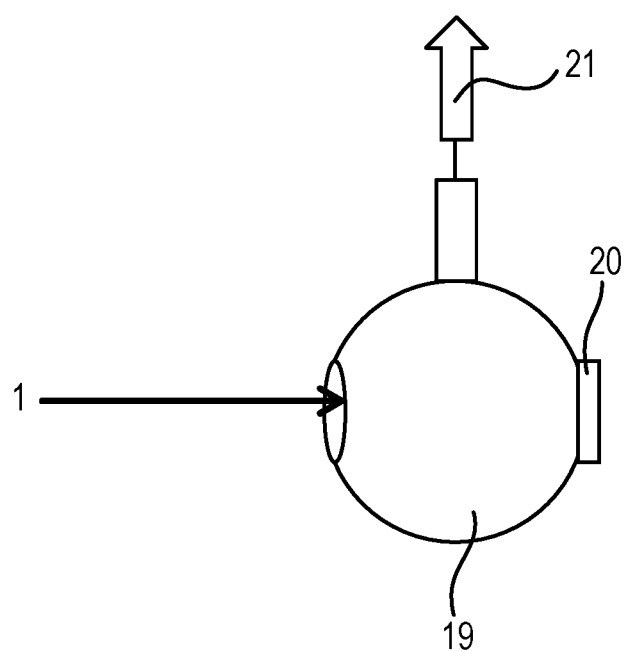
FIG. 8 is a schematic diagram for illustrating a measurement form of reflectance by a spectrophotometer.

Hereinafter, the solar reflectance evaluation after the lightfast test in the anoxic atmosphere will be described. As illustrated in FIG. 8, the reflectance of incident light was measured using a spectrophotometer (U-4000; Hitachi High-Tech Science Corporation), and the measured reflectance was converted into the solar reflectance.

First, a method of measuring the reflectance will be described. As illustrated in FIG. 8, incident light 1 having the wavelength of 300 nm to 2500 nm was made incident on an integrating sphere 19. Then, a blank of an alumina sintered body which causes 100% reflection was set to a test piece attaching portion 20 inclined at 5° to the incident light 1, and baseline measurement was performed. Subsequently, a test piece having the film of the present invention formed in place of the blank was set to the test piece attaching portion 20, light having the wavelength of 300 nm to 2500 nm was made incident, the incident light was detected by a detector 21, and the reflectance was measured. Next, the measured reflectance was multiplied by a weighting numerical value (weighting coefficient) on the basis of the Japanese Industrial Standards JIS-K 560 (how to obtain solar reflectance of coating film) and then integrated, and the solar reflectance was calculated from the integrated value.

For the sample to be measured, the film of the present invention was formed on the metal plate having the size of 30 mm square and the thickness of 1 mm and used. As the metal plate, any one of the stainless alloy, the aluminum alloy, the titanium alloy and the magnesium alloy was used. The film of the present invention was applied to the metal plate of the magnesium alloy so as to have the film thickness of 50 μm with the spin coater and then burned. The cellophane adhesive tape (CT-12M; Nichiban Co., Ltd.) was stuck to the upper surface of the film of the present invention, and the obtained film was placed in the lightfast tester (SUNTEST XXL+; ATLAS) for 200 hours under the conditions of the direct irradiation 300 nm to 400 nm, the radiation intensity 50 W/m$^2$±2 W/m$^2$ and the black panel temperature 63° C.±3° C. After the lightfast test, the cellophane adhesive tape was peeled from the film and washed with acetone. Then, within 24 hours, the reflectance at the wavelength of 300 nm to 2500 nm was measured with the spectrophotometer, and the solar reflectance was calculated the basis of the Japanese Industrial Standards JIS-K 560.

When the solar reflectance after the lightfast test in the anoxic atmosphere is 74% or more, it can be said that the film is a very good film because the temperature reduction effect is high. When the solar reflectance is 65% or more and less than 74%, it can be said that the film is a good film because the temperature reduction effect is relatively high. When the solar reflectance is less than 65%, it cannot be said that the film is a good film because the temperature reduction effect deteriorates.

(Three-Grade Evaluation of A to C)
A: the solar reflectance after the lightfast test in the anoxic atmosphere is 74% or more
B: the solar reflectance after the lightfast test in the anoxic atmosphere is 65% or more and less than 74%
C: the solar reflectance after the lightfast test in the anoxic atmosphere is less than 65%

Figure 9:
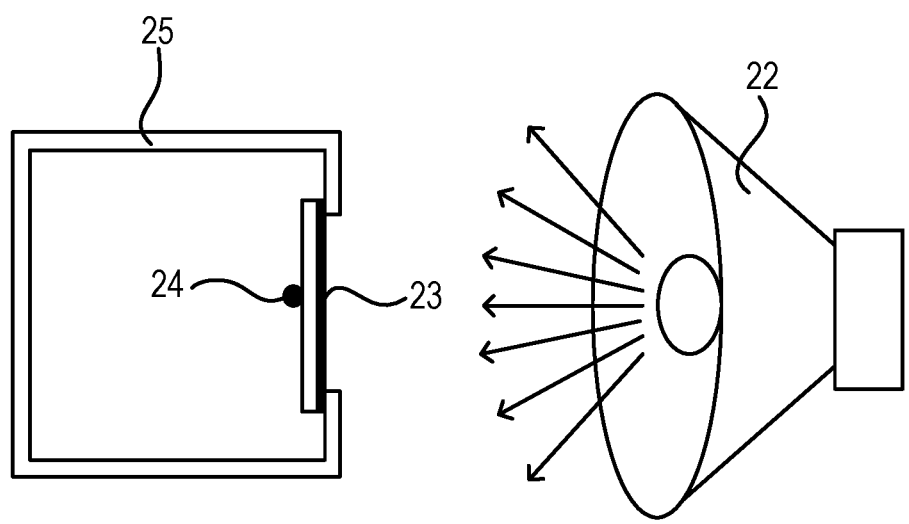
FIG. 9 is a schematic diagram for describing a temperature evaluating method.

<Temperature Reduction Effect after Lightfast Test>
FIG. 9 is a schematic diagram for illustrating a temperature evaluating method. As illustrated in FIG. 9, a lamp 22, a temperature measuring jig 25 and a temperature evaluation test piece 23 were used for temperature measurement. As the temperature evaluation test piece 23, the film of the present invention was formed on the metal plate having the size of 100 mm square and the thickness of 1 mm and used. As the metal plate, any one of the stainless alloy, the aluminum alloy, the titanium alloy and the magnesium alloy was used. The film of the present invention was applied to the metal plate so as to have the film thickness of 50 μm with the spin coater and then burned. As the temperature measuring jig 25, the containerboard having the own-color surface of 120 mm×120 mm×120 mm was used, and the window portion of 90 mm×90 mm was provided at the attaching portion of the temperature evaluation test piece 23. As the lamp 22, the color-rendering HID (High-Intensity Discharge) lamp (HI-LUX™ MT150FD 6500K; IWASAKI ELECTRIC Co., Ltd.) was used.

Next, the temperature evaluation test piece 23 was attached to the temperature measurement jig 25, and a thermocouple 24 was attached to the back surface of the temperature evaluation test piece 23. The temperature measurement jig 25 to which the temperature evaluation test piece 23 was attached was installed so that the distance of the lamp 22 was 100 mm. Next, the temperature evaluation test piece was irradiated by the lamp 22 for 60 minutes, and the temperature after 60 minutes was measured.

The temperature reduction effect was given by forming the black blank on the surface of the temperature evaluation test piece 23, measuring the temperature, and calculating the difference from the temperature measurement result of the film of the example.

The paint, which was prepared by mixing 20 g of the carbon black (MA100; Mitsubishi Chemical Corporation), 100 g of the epoxy resin (jER™ 828; Mitsubishi Chemical Corporation), 70 g of the amine curing agent (ST11; Mitsubishi Chemical Corporation) and 20 g of the thinner with others, is coated on the surface of the temperature evaluation test piece 23 by the planetary rotating device, and the obtained test piece is burned, thereby making the black blank.

It can be said that the film is a very good film when the temperature reduction effect is 10° C. or higher. It can be said that the film is a relatively good film when the temperature reduction effect is 5° C. or higher and lower than 10° C. Besides, when the temperature reduction effect is lower than 5° C., it cannot be said that the film has the good temperature reduction effect.

(Three-Grade Evaluation of A to C)
A: the temperature reduction effect is 10° C. or higher
B: the temperature reduction effect is 5° C. or higher and lower than 10° C.
C: the temperature reduction effect is lower than 5° C.

Example 1

<Preparation of Paint>
In Example 1, the paint was made by the following method. That is, 15 g of the titanium oxide (converted into 20% by volume of the coating film), 13 g of the resin (converted into 57.5% by volume of the coating film), 0.75 g of the first silica (converted into 1.8% by volume of the coating film), 1 g of the pigment (converted into 3.5% by volume of the coating film), 3.9 g of the curing agent (converted into 17.2% by volume of the coating film) and 10 g of the thinner were weighed and stirred for 10 minutes by the planetary rotating device (AR-100; THINKY CORPORATION), and the paint of Example 1 was obtained. Besides, D-970 (SAKAI CHEMICAL INDUSTRY Co., Ltd.; average particle size 0.26 μm, silica surface coating) was used as the titanium oxide, and OLESTER™ Q-691 (Mitsui Chemicals, Inc.) was used as the resin.

Besides, AEROSIL® R-972 (NIPPON AEROSIL Co., Ltd.; average primary particle size 16 nm, and average particle size after cohesion 100 nm) was used as the first silica, CHROMOFINE BLACK A1103 (Dainichiseika Color & Chemicals Mfg. Co., Ltd.) was used as the pigment, and TAKENATE™ D-120N (Mitsui Chemicals, Inc.) was used as the curing agent.

<Making of Film>

In Example 1, the film was made by the following method. The above paint was applied to the test piece for the discoloration evaluation in the anoxic atmosphere, the test piece for the solar reflectance evaluation after the lightfast test in the anoxic atmosphere, and the test piece for the temperature reduction effect after the lightfast test, so as to have the film thickness of 50 μm, the obtained test pieces were dried at room temperature overnight, and then the dried test pieces were burned at 130° C. for 30 minutes, thereby obtaining the film of Example 1.

Examples 2 to 13

In Examples 2 to 13, the paints and the films were made in the same manner as in Example 1 except that the materials and the conditions in Tables 1 and 2 were used.

As the titanium oxide, the following materials were used. That is, FTR-700 (SAKAI CHEMICAL INDUSTRY Co., Ltd.; silica surface coating) was used for the titanium oxide having the average particle size of 0.26 μm, and ET0210 (TOHO TITANIUM CO., LTD.) was used for the titanium oxide having the average particle size of 2 μm. The titanium oxides respectively having the average particle sizes of 5 μm and 7 μm were made by drying the titanium oxide having the particle size of 80 nm at a low temperature with a rotary kiln and then burning the dried titanium oxide at the temperature of 1100° C. for 2 hours. For each of the titanium oxides respectively having the average particle sizes of 2 μm, 5 μm and 7 μm, the solution was obtained by immersing the titanium oxide in tetraethyl orthosilicate, isopropyl alcohol and 1% hydrochloric acid solution at 50° C. for 3 hours and coating the titanium oxide with silica gel. Next, the obtained silica gel coating solution was washed with isopropyl alcohol and dried at a low temperature with the rotary kiln. After drying, the obtained substance was burned at 400° C. for 2 hours, so that the titanium oxide coated with the silica was obtained.

Besides, AEROSIL® R-805 (NIPPON AEROSIL Co., Ltd.) was used for the first silica having the average particle size of 10 nm, and QSC-100 (Denka Company Limited) was used for the first silica having the average particle size of 110 nm.

TABLE 1

| | | | Film of Example 1 | Film of Example 2 | Film of Example 3 | Film of Example 4 | Film of Example 5 | Film of Example 6 |
|---|---|---|---|---|---|---|---|---|
| Film | Resin | Material | Acrylic polyol | Acrylic polyol | Acrylic polyol | Acrylic polyol | Acrylic polyol | Acrylic polyol |
| | | Additive amount (% by volume) | 57.5 | 57.5 | 57.5 | 57.5 | 57.5 | 57.5 |
| | Titanium oxide | Material | Titanium oxide | Titanium oxide | Titanium oxide | Titanium oxide | Titanium oxide | Titanium oxide |
| | | Coat | Silica | Silica | Silica | Silica | Silica | Silica |
| | | Particle size | 0.26 | 5 | 0.2 | 7 | 0.26 | 0.26 |
| | | Additive amount (% by volume) | 20 | 20 | 20 | 20 | 20 | 20 |
| | | % by mass of nonvolatile component in paint | 45 | 45 | 45 | 45 | 45 | 45 |
| | First silica | Average particle size (nm) | 12 | 12 | 12 | 12 | 10 | 110 |
| | | Additive amount (% by volume) | 1.8 | 1.8 | 1.8 | 1.8 | 1.8 | 1.8 |
| | | % by mass of nonvolatile component in paint | 2 | 2 | 2 | 2 | 2 | 2 |
| | Pigment | Kind | Azomethine black | Azomethine black | Azomethine black | Azomethine black | Azomethine black | Azomethine black |
| | | Additive amount (% by volume) | 3.5 | 3.5 | 3.5 | 3.5 | 3.5 | 3.5 |
| | Curing agent | Kind | Isocyanate | Isocyanate | Isocyanate | Isocyanate | Isocyanate | Isocyanate |
| | | Additive amount (% by volume) | 17.2 | 17.2 | 17.2 | 17.2 | 17.2 | 17.2 |
| Characteristic of film | | Solar reflectance (before lightfast test) | 74 | 80 | 74 | 78 | 74 | 74 |
| | | Lightness | 80 | 71 | 81 | 71 | 80 | 80 |

TABLE 2

|  |  |  | Film of Example 7 | Film of Example 8 | Film of Example 9 | Film of Example 10 | Film of Example 11 | Film of Example 12 | Film of Example 13 |
|---|---|---|---|---|---|---|---|---|---|
| Film | Resin | Material | Acrylic polyol | Acrylic polyol | Acrylic polyol | Acrylic polyol | Acrylic polyol | Acrylic polyol | Acrylic polyol |
|  |  | Additive amount (% by volume) | 77.4 | 58.3 | 49.3 | 58.8 | 47.3 | 67 | 52 |
|  | Titanium oxide | Material | Titanium oxide | Titanium oxide | Titanium oxide | Titanium oxide | Titanium oxide | Titanium oxide | Titanium oxide |
|  |  | Coat | Silica | Silica | Silica | Silica | Silica | Silica | Silica |
|  |  | Particle size | 2 | 0.26 | 0.26 | 0.26 | 0.26 | 0.26 | 0.26 |
|  |  | Additive amount (% by volume) | 20.7 | 20 | 20 | 20 | 20 | 5 | 31 |
|  |  | % by mass of nonvolatile component in paint | 45 | 45 | 40 | 45 | 39 | 20 | 60 |
|  | First silica | Average particle size (nm) | 12 | 12 | 12 | 12 | 12 | 12 | 12 |
|  |  | Additive amount (% by volume) | 1.9 | 1 | 10 | 0.5 | 15 | 1.8 | 1.6 |
|  |  | % by mass of nonvolatile component in paint | 2 | 1.2 | 12 | 0.6 | 14 | 2 | 1.7 |
|  | Pigment | Kind | — | Azomethine black | Azomethine black | Azomethine black | Azomethine black | Azomethine black | Azomethine black |
|  |  | Additive amount (% by volume) | 0 | 3.5 | 3.5 | 3.5 | 3.5 | 3.5 | 3.5 |
|  | Curing agent | Kind | Isocyanate | Isocyanate | Isocyanate | Isocyanate | Isocyanate | Isocyanate | Isocyanate |
|  |  | Additive amount (% by volume) | — | 17.2 | 17.2 | 17.2 | 17.2 | 19 | 16 |
| Characteristic of film |  | Solar reflectance (before lightfast test) | 98 | 74 | 70 | 74 | 65 | 74 | 88 |
|  |  | Lightness | 94 | 80 | 80 | 80 | 90 | 92 | 94 |

<Evaluation Results>

The results of the evaluation of the discoloration (ΔE*) after the lightfast test, the solar reflectance (R) after the lightfast test and the temperature reduction effect after the lightfast test of the films of Examples 1 to 13 are shown in Tables 3 and 4.

As the measurement result, it is preferable that the discoloration in the anoxic atmosphere is less than 1.0 in ΔE*, more preferably ΔE* is less than 0.6. Further, it is preferable that the solar reflectance after the lightfast test in the anoxic atmosphere is 65% or more, more preferably 74% or more. Furthermore, it is preferable that the temperature reduction effect after the lightfast test is 5° C. or higher with respect to the black blank, more preferably 10° C. or higher.

As shown in Table 3, the discoloration (ΔE*) after the lightfast test, the solar reflectance (R) after the lightfast test and the temperature reduction effect after the lightfast test in Example 1 in which acrylic polyol, the silica-coated titanium oxide having the average particle size of 0.26 μm, the first silica having the average particle size of 100 nm, the azomethine black pigment and isocyanate were used were evaluated. More specifically, ΔE* was less than 0.6 and was very good, R after the lightfast test was 74% or more and was very good, and the temperature reduction effect was 5° C. or higher and lower than 10° C. and was good.

In Table 3, the reflectance, the temperature reduction effect and the film thickness accuracy of the heat-shielding film of Example 2 using titanium oxide having the large average particle size of 5 μm as compared with Example 1 were evaluated. More specifically, ΔE* was less than 0.6 and was very good, R after the lightfast test was 74% or more and was very good, and the temperature reduction effect was 10° C. or higher and was very good.

In Table 3, the reflectance and the temperature reduction effect of the film of Example 3 using the titanium oxide having the slightly small average particle size of 0.2 μm as compared with Example 1 were evaluated. More specifically, ΔE* was less than 0.6 and was very good, R after the lightfast test was 74% or more and was very good, and the temperature reduction effect was 5° C. or higher and lower than 10° C. and was good.

In Table 3, the reflectance and the temperature reduction effect of the film of Example 4 using the titanium oxide having the large average particle size of Tim as compared with Example 1 were evaluated. More specifically, ΔE* was less than 0.6 and was very good, R after the lightfast test was 74% or more and was very good, and the temperature reduction effect was 10° C. or higher and was very good.

In Table 3, the reflectance and the temperature reduction effect of the film of Example 5 using the silica having the small average particle size of 10 nm as compared with Example 1 were evaluated. More specifically, ΔE* was 0.6 or more and less than 1.0 and was good, R after the lightfast test was 65% or more and less than 74% and was good, and the temperature reduction effect was 5° C. or higher and lower than 10° C. and was good.

In Table 3, the reflectance and the temperature reduction effect of the film of Example 6 using the silica having the large average particle size of 110 nm as compared with Example 1 were evaluated. More specifically, ΔE* was less than 0.6 and was very good, R after the lightfast test was 74% or more and was very good, and the temperature reduction effect was 5° C. or higher and lower than 10° C. and was good.

In Table 4, the reflectance and the temperature reduction effect of the film of Example 7 were evaluated. In this example, the silicone resin having a low refractive index and the titanium oxide having the large average particle size of 2 μm as compared with Example 1 were used, and the lightness and the solar reflectance were respectively adjusted to 94 and 98% by eliminating the pigment. More specifically, ΔE* was 1.0 or more and less than 1.5 and was slightly inferior, but there was no problem. Besides, R after the lightfast test was 74% or more and was very good, and the temperature reduction effect was 10° C. or higher and was very good.

In Table 4, the reflectance and the temperature reduction effect of the film of Example 8, in which the additive amount of the first silica was adjusted to be small 1% by volume as compared with Example 1, were evaluated. More specifically, ΔE* was 0.6 or more and less than 1.0 and was good, R after the lightfast test was 65% or more and less than 74% and was good, and the temperature reduction effect was 5° C. or higher and lower than 10° C. and was good.

In Table 4, the reflectance and the temperature reduction effect of the film of Example 9, in which the additive amount of the first silica was adjusted to be large 10% by volume as compared with Example 1, were evaluated. More specifically, ΔE* was 0.6 or more and less than 1.0 and was good, R after the lightfast test was 65% or more and less than 74% and was good, and the temperature reduction effect was 5° C. or higher and lower than 10° C. and was good.

In Table 4, the reflectance and the temperature reduction effect of the film of Example 10, in which the additive amount of the first silica was adjusted to be small 0.5% by volume as compared with Example 1, were evaluated. More specifically, ΔE* was 1.0 or more and less than 1.5 and was slightly inferior, but there was no problem. Besides, R after the lightfast test was 65% or more and less than 74% and was good, and the temperature reduction effect was 5° C. or higher and lower than 10° C. and was good.

In Table 4, the reflectance and the temperature reduction effect of the film of Example 11, in which the additive amount of the first silica was adjusted to be large 15% by volume as compared with Example 1, were evaluated. More specifically, ΔE* was 0.6 or more and less than 1.0 and was good, R after the lightfast test was 65% or more and less than 74% and was good, and the temperature reduction effect was 5° C. or higher and lower than 10° C. and was good.

In Table 4, the reflectance and the temperature reduction effect of the film of Example 12, in which the additive amount of the first titanium oxide was adjusted to be small 20% by mass as compared with Example 1, were evaluated. More specifically, ΔE* was less than 0.6 and was very good, R after the lightfast test was 65% or more and less than 74% and was good, and the temperature reduction effect was 5° C. or higher and lower than 10° C. and was good.

In Table 4, the reflectance and the temperature reduction effect of the film of Example 13, in which the additive amount of the first titanium oxide was adjusted to be large 60% by mass as compared with Example 1, were evaluated. More specifically, ΔE* was less than 0.6 and was very good, R after the lightfast test was 65% or more and less than 74% and was good, and the temperature reduction effect was 5° C. or higher and lower than 10° C. and was good.

TABLE 3

|  | Film of Example 1 | Film of Example 2 | Film of Example 3 | Film of Example 4 | Film of Example 5 | Film of Example 6 |
|---|---|---|---|---|---|---|
| Discoloration (ΔE*) in anoxic atmosphere | A | A | A | A | B | A |
| Reflectance (R; %) after lightfast test in anoxic atmosphere | A | A | A | A | B | A |
| Temperature reduction effect after lightfast test | B | A | B | A | B | B |

TABLE 4

|  | Film of Example 7 | Film of Example 8 | Film of Example 9 | Film of Example 10 | Film of Example 11 | Film of Example 12 | Film of Example 13 |
|---|---|---|---|---|---|---|---|
| Discoloration (ΔE*) in anoxic atmosphere | C | B | B | C | B | A | A |

TABLE 4-continued

|  | Film of Example 7 | Film of Example 8 | Film of Example 9 | Film of Example 10 | Film of Example 11 | Film of Example 12 | Film of Example 13 |
|---|---|---|---|---|---|---|---|
| Reflectance (R; %) after lightfast test in anoxic atmosphere | A | B | B | B | B | B | B |
| Temperature reduction effect after lightfast test | A | B | B | B | B | B | B |

Comparative Examples 1 to 8

Preparation of the heat-shielding paint, making of the heat-shielding film, evaluation of the discoloration (ΔE*) after the lightfast test, evaluation of the solar reflectance (R) after the lightfast test, and evaluation of the temperature reduction effect after the lightfast test were performed for the purpose of comparison, respectively in the same manners as those in Examples 1 to 13 described above. Hereinafter, the points different from Examples 1 to 13 will be described.

Table 5 shows the materials constituting the heat-shielding films of Comparative Examples 1 to 8 and the additive amounts thereof. Table 6 shows the results of evaluation using the heat-shielding films of Comparative Examples 1 to 8, respectively.

In Table 5, the reflectance and the temperature reduction effect of the heat-shielding film of Comparative Example 1 using the titanium oxide (JR-1000; TAYCA CORPORATION) coated with alumina and having the average particle size of 1 μm as compared with Example 1 were evaluated. More specifically, ΔE* was 1.5 or more and was bad, R after the lightfast test was less than 65% and was bad, and the temperature reduction effect was lower than 5° C. and was bad.

In Table 5, the reflectance and the temperature reduction effect of the heat-shielding film of Comparative Example 2 using the first silica (AEROSIL® R-812 (NIPPON AEROSIL Co., Ltd.) having the small average particle size of 7 nm as compared with Example 1 were evaluated. More specifically, ΔE* was 1.5 or more and was bad, R after the lightfast test was less than 65% and was bad, and the temperature reduction effect was lower than 5° C. and was bad.

In Table 5, the reflectance and the temperature reduction effect of the heat-shielding film of Comparative Example 3 using the first silica (SFP-20M; Denka Company Limited) having the large average particle size of 300 nm as compared with Example 1 were evaluated. More specifically, ΔE* was 1.5 or more and was bad, R after the lightfast test was less than 65% and was bad, and the temperature reduction effect was lower than 5° C. and was bad.

In Table 5, the reflectance and the temperature reduction effect of the heat-shielding film of Comparative Example 4 using the titanium oxide (A-190; SAKAI CHEMICAL INDUSTRY Co., Ltd.) having the small average particle size of 0.15 μm as compared with Example 1 were evaluated. More specifically, ΔE* was 1.0 or more and less than 1.5 and was bad, R before and after the lightfast test were both less than 65% and were bad, and the temperature reduction effect was lower than 5° C. and was bad.

In Table 5, the reflectance and the temperature reduction effect of the heat-shielding film of Comparative Example 5 in which the first silica was not contained as compared with Example 1 were evaluated. More specifically, ΔE* was 1.0 or more and less than 1.5 and was bad, R before and after the lightfast test were both less than 65% and were bad, and the temperature reduction effect was lower than 5° C. and was bad.

In Table 5, the reflectance and the temperature reduction effect of the heat-shielding film of Comparative Example 6 in which 20% by mass of the first silica was contained as compared with Example 1 were evaluated. More specifically, ΔE* was less than 0.6 and was good, R before and after the lightfast test were both less than 65% and were bad, and the temperature reduction effect was lower than 5° C. and was bad.

In Table 5, the reflectance and the temperature reduction effect of the heat-shielding film of Comparative Example 7 in which 15% by mass of the titanium oxide was contained as compared with Example 1 were evaluated. More specifically, ΔE* was less than 0.6 and was good, R before and after the lightfast test were both less than 65% and were bad, and the temperature reduction effect was lower than 5° C. and was bad.

In Table 5, the reflectance and the temperature reduction effect of the heat-shielding film of Comparative Example 8 in which 70% by mass of the titanium oxide was contained as compared with Example 1 were evaluated. More specifically, ΔE* was less than 0.6 and was good, R before and after the lightfast test were both less than 74% and were good, and the temperature reduction effect was 10° C. or higher and was good. However, since the film was cracked after the lightfast test, the durability of the coating film was low.

TABLE 5

|  |  |  |  | Film of Comparative Example 1 | Film of Comparative Example 2 | Film of Comparative Example 3 | Film of Comparative Example 4 | Film of Comparative Example 5 | Film of Comparative Example 6 | Film of Comparative Example 7 | Film of Comparative Example 8 |
|---|---|---|---|---|---|---|---|---|---|---|---|
| Film | Resin | Material | | Acrylic polyol | Acrylic polyol | Acrylic polyol | Acrylic polyol | Acrylic polyol | Acrylic polyol | Acrylic polyol | Acrylic polyol |
|  |  | Additive amount (% by volume) | | 57.5 | 57.5 | 57.5 | 57.5 | 59 | 49 | 68 | 43 |

TABLE 5-continued

|  |  | Film of Comparative Example 1 | Film of Comparative Example 2 | Film of Comparative Example 3 | Film of Comparative Example 4 | Film of Comparative Example 5 | Film of Comparative Example 6 | Film of Comparative Example 7 | Film of Comparative Example 8 |
|---|---|---|---|---|---|---|---|---|---|
| Titanium oxide | Material | Titanium oxide | Titanium oxide | Titanium oxide | Titanium oxide | Titanium oxide | Titanium oxide | Titanium oxide | Titanium oxide |
|  | Coat | Alumina | Silica | Silica | Silica | Silica | Silica | Silica | Silica |
|  | Particle size | 0.26 | 0.26 | 0.26 | 0.15 | 0.26 | 0.26 | 0.26 | 0.26 |
|  | Additive amount (% by volume) | 20 | 20 | 20 | 20 | 20 | 17 | 4.8 | 40 |
|  | % by mass of nonvolatile component in paint | 45 | 45 | 45 | 45 | 47 | 38 | 15 | 70 |
| First silica | Average particle size (nm) | 100 | 7 | 300 | 100 | 100 | 100 | 100 | 100 |
|  | Additive amount (% by volume) | 1.8 | 1.8 | 1.8 | 1.8 | 0 | 16 | 2.1 | 1.3 |
|  | % by mass of nonvolatile component in paint | 2 | 2 | 2 | 2 | 0 | 20 | 3.6 | 3.6 |
| Pigment | Kind | Azomethine black | Azomethine black | Azomethine black | Azomethine black | Azomethine black | Azomethine black | Azomethine black | Azomethine black |
|  | Additive amount (% by volume) | 3.5 | 3.5 | 3.5 | 3.5 | 3.5 | 3 | 3 | 2.6 |
| Curing agent | Kind | Isocyanate | Isocyanate | Isocyanate | Isocyanate | Isocyanate | Isocyanate | Isocyanate | Isocyanate |
|  | Additive amount (% by volume) | 17.2 | 17.2 | 17.2 | 17.2 | 17.6 | 15 | 20 | 13 |
| Characteristic of film | Solar reflectance (before lightfast test) | 74 | 74 | 74 | 67 | 74 | 64 | 64 | 90 |
|  | Lightness | 80 | 80 | 80 | 75 | 80 | 81 | 74 | 80 |

TABLE 6

|  | Film of Comparative Example 1 | Film of Comparative Example 2 | Film of Comparative Example 3 | Film of Comparative Example 4 | Film of Comparative Example 5 | Film of Comparative Example 6 | Film of Comparative Example 7 | Film of Comparative Example 8 |
|---|---|---|---|---|---|---|---|---|
| Discoloration (ΔE*) in anoxic atmosphere | D | D | D | C | C | A | A | A |
| Reflectance (R; %) after lightfast test in anoxic atmosphere | C | C | C | C | C | C | C | A |
| Temperature reduction effect after lightfast test | C | C | C | C | C | C | C | A |

The film to be formed on the upper surface of the optical apparatus of the present invention can be used for the lens barrels of the optical apparatuses such as the camera, the video camera, the broadcasting device and the like, and can be used for the camera main body, the video camera main body, the surveillance camera, the weather camera and the like which are possibly used outdoors.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-078707, filed Apr. 12, 2017, which is hereby incorporated by reference herein in its entirety.

What is claimed is:

1. An optical apparatus comprising:
a lens;
a lens barrel holding the lens; and
a film formed on a surface of the lens barrel,
wherein the film contains a resin, titanium oxide coated with silica, and an inorganic particle,
wherein an average particle size of the inorganic particle is 110 nm or less,
wherein an average particle size of the titanium oxide coated with the silica is 0.2 µm or more, and
wherein the inorganic particle includes a particle of 10 nm or less.

2. The optical apparatus according to claim 1, wherein a solar reflectance of the surface on which the film is formed is 65% to 98%, and lightness of the surface on which the film is formed is 71 or more.

3. The optical apparatus according to claim 1, wherein the inorganic particle is a silica particle.

4. The optical apparatus according to claim 1, wherein an inorganic particle amount contained in the film is 1% by volume to 10% by volume when volume of an arbitrary region of the film is set to 1.

5. The optical apparatus according to claim 1, wherein the film includes a pigment.

6. The optical apparatus according to claim 1, wherein the inorganic particle fills a coating defect.

7. The optical apparatus according to claim 1, wherein the inorganic particle is attracted to the titanium oxide coated with the silica.

8. An article comprising:
a surface; and
a film containing a resin, titanium oxide coated with silica, and an inorganic particle formed on the surface,
wherein an average particle size of the inorganic particle is 110 nm or less,
wherein an average particle size of the titanium oxide coated with the silica is 0.2 µm or more, and
wherein the inorganic particle includes a particle of 10 nm or less.

9. The article according to claim 8, wherein a solar reflectance is 65% to 98%, and lightness is 71 or more.

10. The article according to claim 8, wherein the inorganic particle is a silica particle.

11. The article according to claim 8, wherein an amount of the inorganic particles contained in the film is 1% by volume to 10% by volume when volume of an arbitrary region of the film is set to 1.

12. The article according to claim 8, wherein the film includes a pigment.

13. The article according to claim 8, wherein the inorganic particle fills a coating defect.

14. The article according to claim 8, wherein the inorganic particle is attracted to the titanium oxide coated with the silica.

15. Paint which contains a resin, titanium oxide coated with silica, and an inorganic particle,
wherein a content of the titanium oxide coated with the silica is 20% by mass to 60% by mass with respect to a nonvolatile component in the paint,
wherein an inorganic particle content is 0.6% by mass to 14% by mass with respect to the nonvolatile component in the paint,
wherein an average particle size of the titanium oxide coated with the silica is 0.2 µm or more,
wherein an average particle size of the inorganic particle is 110 nm or less, and
wherein the inorganic particle includes a particle of 10 nm or less.

16. The paint according to claim 15, wherein the inorganic particle is a silica particle.

17. The paint according to claim 15, wherein the paint includes a pigment.

18. A lens barrel comprising:
a surface; and
a film containing a resin, titanium oxide coated with silica, and an inorganic particle formed on the surface,
wherein an average particle size of the inorganic particle is 110 nm or less,
wherein an average particle size of the titanium oxide coated with the silica is 0.2 µm or more, and
wherein the titanium oxide coated with silica has a portion where a surface of the titanium oxide is coated with the silica and a portion where the surface of the titanium oxide is not coated with the silica, and the inorganic particle is in the portion where the surface of the titanium oxide is not coated with the silica.

19. The lens barrel according to claim 18, wherein the inorganic particle is a silica particle.

20. The lens barrel according to claim 19, wherein a silica particle amount in the film is 1% by volume to 10% by volume when volume of an arbitrary region of the film is set to 1.

21. An optical apparatus comprising:
a surface; and
a film containing a resin, titanium oxide coated with silica, and an inorganic particle formed on the surface,
wherein an average particle size of the inorganic particle is 110 nm or less,
wherein an average particle size of the titanium oxide coated with the silica is 0.2 µm or more,
wherein the titanium oxide coated with the silica has a coating defect, and
wherein the inorganic particle is in contact with the coating defect.

22. An article comprising:
a surface; and
a film containing a resin, titanium oxide coated with silica, and an inorganic particle formed on the surface,
wherein an average particle size of the inorganic particle is 110 nm or less, wherein an average particle size of the titanium oxide coated with the silica is 0.2 µm or more, wherein the titanium oxide coated with the silica has a coating defect, and wherein the inorganic particle is in contact with the coating defect.

* * * * *